(12) United States Patent
Dawkins et al.

(10) Patent No.: US 8,452,941 B2
(45) Date of Patent: May 28, 2013

(54) SYSTEM AND METHOD FOR DISTRIBUTING RANDOM AND SEQUENTIAL DATA IN A TIERED STORAGE SYSTEM

(75) Inventors: William Price Dawkins, Jonestown, TX (US); Stephen Gouze Luning, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 656 days.

(21) Appl. No.: 12/565,258

(22) Filed: Sep. 23, 2009

(65) Prior Publication Data

US 2011/0072233 A1   Mar. 24, 2011

(51) Int. Cl.
*G06F 12/00* (2006.01)

(52) U.S. Cl.
USPC ........... 711/206; 711/114; 711/170; 711/203; 711/209

(58) Field of Classification Search
USPC ...... 711/4, 114, 170, 203, 206, 209, E12.001, 711/E12.059
See application file for complete search history.

(56) References Cited

U.S. PATENT DOCUMENTS

| | | | |
|---|---|---|---|
| 6,925,529 B2 | 8/2005 | Bohrer et al. | 711/114 |
| 7,398,418 B2 | 7/2008 | Soran et al. | 714/6 |
| 7,404,102 B2 | 7/2008 | Soran et al. | 714/5 |
| 7,493,514 B2 | 2/2009 | Soran et al. | 714/6 |
| 7,574,622 B2 | 8/2009 | Soran et al. | 714/6 |
| 7,849,352 B2 | 12/2010 | Soran et al. | 714/5 |
| 7,941,695 B2 | 5/2011 | Soran et al. | 714/6 |
| 7,945,810 B2 | 5/2011 | Soran et al. | 714/6 |
| 7,962,778 B2 | 6/2011 | Soran et al. | 714/5 |
| 8,020,036 B2 | 9/2011 | Soran et al. | 714/6.1 |
| 8,321,721 B2 | 11/2012 | Soran et al. | 714/6.1 |
| 2011/0078119 A1 | 3/2011 | Soran et al. | 707/649 |
| 2011/0258385 A1 | 10/2011 | Soran et al. | 711/114 |
| 2011/0258388 A1 | 10/2011 | Soran et al. | 711/114 |
| 2012/0124285 A1 | 5/2012 | Soran et al. | 711/114 |
| 2012/0166725 A1 | 6/2012 | Soran et al. | 711/114 |

FOREIGN PATENT DOCUMENTS

WO    2005/017737    2/2005

*Primary Examiner* — Jasmine Song
(74) *Attorney, Agent, or Firm* — Baker Botts L.L.P.

(57) ABSTRACT

This disclosure provides a method for assigning data in an information handling system including a plurality of physical storage resources comprising a first tier and a second tier which has a lower performance and cost relative to capacity than the first tier. A tier manager may be hosted on the information handling system and in electronic communication with the plurality physical storage resources. The tier manager may, for each page: determine a seek distance value, determine an operation rate, determine an operation size value, determine an elapsed time value, and calculate a relative randomness value using the seek distance value, operation rate, operation size value, and elapsed time value determined for each page. A classification module may assign a physical location for each page such that the relative randomness value for each page in the first tier is greater than in the second tier.

20 Claims, 3 Drawing Sheets

SYSTEM AND METHOD FOR DISTRIBUTING RANDOM AND SEQUENTIAL DATA IN A TIERED STORAGE SYSTEM

TECHNICAL FIELD

The present disclosure relates in general to information handling systems, and more particularly to the distribution of data in information handling systems with tiered storage systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Tiered storage is a data storage concept which includes high-cost and low-cost storage media. In general, high-speed storage devices are more expensive (per byte stored) than slower devices. For example, solid state disks are more expensive than hard disks, which are in turn more expensive than devices such as optical discs and magnetic tape drives. While some users may prefer to have all data available on high-speed devices, such a deployment is often not cost-effective. Tiered storage schemes place the bulk of the data on slower devices. In a typical tiered storage system, data files which are frequently used are stored on high-speed storage devices. Since only rarely-used files are on slower devices, most users will not notice any slowdown in practice.

SUMMARY

In accordance with the teachings of the present disclosure, an apparatus for managing the distribution of random and sequential data in information handling systems is disclosed. The apparatus may comprise a system controller for an information handling system. The information handling system may include a plurality of physical storage resources arranged in a first tier and a second tier such that both a performance and a cost relative to capacity of the plurality of physical storage resources, in the first tier are greater than those in the second tier. The system controller may include a tier manager in electronic communication with the plurality of physical storage resources, a combined logical address space of the plurality of physical storage resources divided into pages, and a classification module in electronic communication with the tier manager and the plurality of physical storage resources. Each page may occupy a predetermined and an equivalent portion of combined logical address space. The tier manager may be configured to perform operations including: determining a seek distance value for each page; determining an operation rate for each page; determining an operation size value for each page; determining an elapsed time value for each page; calculating a relative randomness value for each page using at least the seek distance value, the operation rate, the operation size value, and the elapsed time value determined for each page; and comparing the relative randomness values for each page. The seek distance value may be defined as an average seek distance between consecutive input-output accesses within a page. The operation rate may be defined as an average number of input-output operations per second to a given page. The operation size value may be defined as an average size of the input-output operations to a given page. The elapsed time value may be defined as a time that has elapsed since the last access to a given page. The classification module may be configured to perform operations including: assigning a physical location for each page such that the relative randomness value for each page in the first tier is greater than the relative randomness value for each page in the second tier; and automatically relocating the pages according to the assigned physical location for each page.

In accordance with another embodiment of the present disclosure, an information handling system is disclosed. An information handling system may include a plurality of physical storage resources, a tier manager hosted on the information handling system and in electronic communication with the plurality physical storage resources, and a classification module in electronic communication with the tier manager and the plurality of physical storage resources. The plurality of physical storage resources may include a first tier including one or more physical storage resources; and a second tier including one or more physical storage resources, each of which has a lower performance and cost relative to capacity than each of the one or more physical storage resources of the first tier. A combined logical address space of the plurality of physical storage resources may be divided into pages. Each page may occupy a predetermined and an equivalent amount of logical address space. The tier manager may be configured to perform operations including: determining a seek distance value for each page, determining an operation rate for each page, determining an operation size value for each page, determining an elapsed time value for each page, calculating a relative randomness value for each page using at least the seek distance value, operation rate, operation size value, and elapsed time value determined for each page, and comparing the relative randomness values for each page. The seek distance value may be defined as an average seek distance between consecutive input-output accesses within a page. The operation rate may be defined as an average number of input-output operations per second to a given page. The operation size value may be defined as an average size of the input-output operations to a given page. The elapsed time value may be defined as a time that has elapsed since the last access to a given page. The classification module may be configured to perform operations including: assigning a physical location for each page such that the relative randomness value for each page in the first tier is greater than the relative randomness value for each page in the second tier; and automatically relocating the pages according to the assigned physical location for each page.

In accordance with another embodiment of the present disclosure, a method for distributing random and sequential data in an information handling system may be provided. The information handling system may include a plurality of physical storage resources arranged in a first and second tier such that the performance and cost relative to capacity of the plurality of physical storage resources in the first tier is greater than those in the second tier. The method may include several steps. It may include determining a seek distance value for each page, determining an operation rate for each page, determining an operation size value for each page, determining an elapsed time value for each page, calculating a relative randomness value for each page using at least the seek distance value, the operation rate, the operation size value, and the elapsed time value determined for each page, comparing the relative randomness values for each page, assigning a physical location for each page such that the relative randomness value for each page in the first tier is greater than the relative randomness value for each page in the second tier, automatically relocating the pages according to the assigned physical locations for each page. The seek distance value may be defined as an average seek distance between consecutive input-output accesses within a page. The operation rate may be defined as an average number of input-output operations per second to a given page. The operation size value may be defined as an average size of the input-output operations to a given page. The elapsed time value may be defined as a time that has elapsed since the last access to a given page.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1:
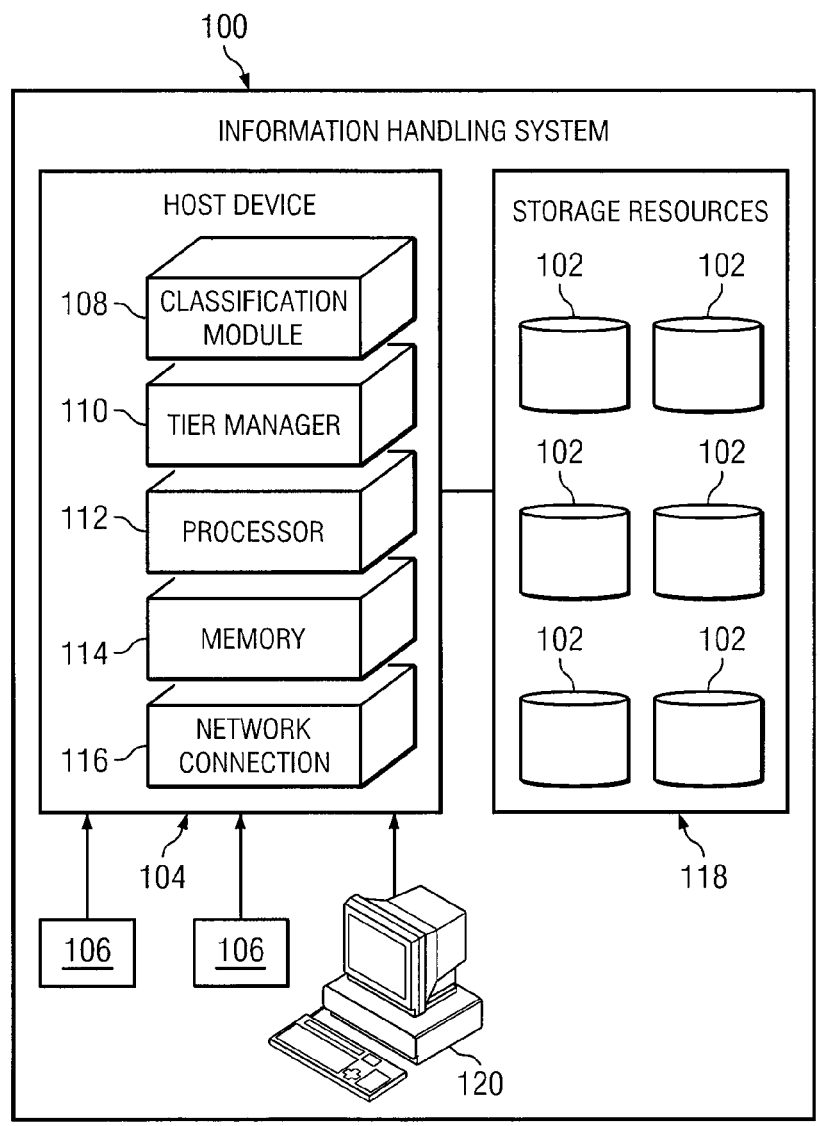
FIG. 1 illustrates a block diagram of an example information handling system in accordance with teachings of the present disclosure.

FIG. 1 illustrates a block diagram of an example information handling system 100 including a host device 104, one or more client systems 106, and a plurality of physical storage resources 118 in accordance with the teachings of the present disclosure.

Host device 104 may include a classification module 108, a tier manager 110, a processor 112, a memory 114, and a network connection 116. Processor 112 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret data, process data, and/or execute program instructions. In some embodiments, processor 112 may execute program instructions, interpret data, and/or process data stored in memory 114 and/or another component of host device 104.

Host device 104 may generally be operable to receive data from and/or communicate data to one or more information handling systems or client systems 106 via electronic communication. In certain embodiments, the host device 104 may be a system controller. In another embodiment, the host device 104 may be a general purpose computer. In yet another embodiment, the host device 104 may be an intelligent switch. In still another embodiment, the host device 104 may be an operating system. In yet another embodiment, the host device 104 may be a distributed file system. In another embodiment, host device 104 may be distributed across multiple resources in an information handling system (e.g., multiple storage controllers each of which is capable of executing some or all of the functions described in this disclosure).

Client systems 106 may include any resource, component, or device of information handling system 100 in communication with host 104 that may make a request related to data stored by storage resources 118. For example, client system 106 may make a data input request to host 104 that includes data to be stored by storage resources 118. As another example, client system 106 may make a request to gather data previously stored by storage resources 118.

Classification module 108 may be in electronic communication with tier manager 110 and the plurality of physical storage resources 118. The classification module 108 will be discussed in further detail in relation to later Figures.

Tier manager 110 may be in electronic communication with classification module 108 and the plurality of physical storage resources 118. The tier manager 110 will be discussed in further detail in relation to later Figures.

Memory 114 may be communicatively coupled to processor 112 and may comprise any system, device, or apparatus operable to retain program instructions or data for a period of time (e.g., computer-readable media). Memory 114 may include random access memory (RAM), electrically erasable programmable read-only memory (EEPROM), a PCMCIA card, flash memory, magnetic storage, opto-magnetic storage, and/or any suitable selection or array of volatile or non-volatile memory that retains data after power to host device 104 is turned off.

Network connection 116 may be any suitable system, apparatus, or device operable to serve as an interface between host device 104 and information handling system 100. Network connection 116 may enable host device 104 to communicate with the information handling system 100 and/or any element associated with the information handling system 100 (e.g., the plurality of physical storage resources 118) using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof.

The plurality of physical storage resources 118 may include one or more physical storage resources 102. For the purposes of this disclosure, a physical storage resource 102 may include any instrumentality or aggregation of instrumentalities that may retain data and/or instructions for a period of time. Physical storage resources 102 may include solid state disks, hard disk drives, magnetic tape libraries, optical disk drives, magneto-optical disk drives, compact disk drives, compact disk arrays, disk array controllers, and/or any computer-readable medium operable to store data. Although the embodiment shown in FIG. 1 depicts six physical storage resources 102, the plurality of physical storage resources 118 may include any number of physical storage resources.

User interface 120 may comprise any instrumentality or aggregation of instrumentalities by which a person may interact with information handling system 100 and/or any element associated with the information handling system 100 (e.g., the plurality of physical storage resources 118 and/or the host device 104). For example, user interface 120 may permit a person to enter data and/or instructions into host device 104 (e.g., via a keyboard, pointing device, and/or other suitable means), and/or otherwise manipulate host device 104 and its associated components. User interface 120 may also permit host device 104 to communicate data to a person (e.g., by means of a display device).

Figure 2:
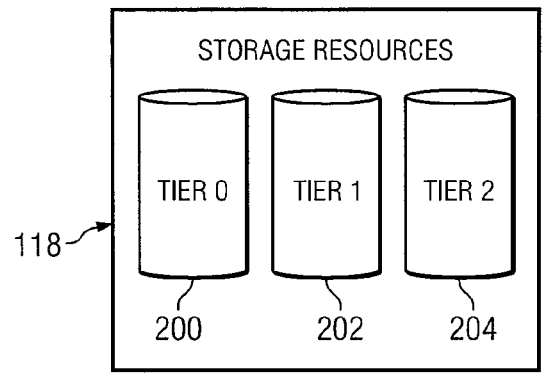
FIG. 2 illustrates an example configuration of physical storage resources with multiple storage tiers in accordance with teachings of the present disclosure.

As depicted in FIG. 2, some embodiments of the plurality of physical storage resources 118 may include one or more storage tiers (e.g., Tier 0 200, Tier 1 202, and Tier 2 204). Each storage tier (200, 202, and 204) may include one or more physical storage resources 102. In one embodiment, the physical storage resources 102 of Tier 1 202 have a lower performance and cost relative to capacity than each of the physical storage resources 102 of Tier 0 200 and each of the physical storage resources 102 of Tier 2 204 have a lower performance and cost relative to capacity than each of the physical storage resources 102 of Tier 1 202.

The performance of a physical storage resource 102 may be characterized by the speed (e.g., input/output operations per second) with which it can access randomly distributed data. To go from point A to point Z in a sequential-access system, a physical storage resource 102 must pass through all intervening points. In a random-access system, physical storage 102 can jump directly to point Z.

In one embodiment of a tiered storage system, Tier 0 200 may include solid state disks (SSDs), Tier 1 202 may include serial attached SCSI disks (SAS disks), and Tier 2 204 may include serial ATA disks (SATA disks). In this embodiment, the physical storage resources 102 of any given storage tier would have a lower performance and cost relative to capacity than each of the physical storage resources of the next highest storage tier (e.g., the SAS disks of Tier 1 202 may have a lower performance and cost relative to capacity than the SSDs of Tier 0 200).

Figure 3:
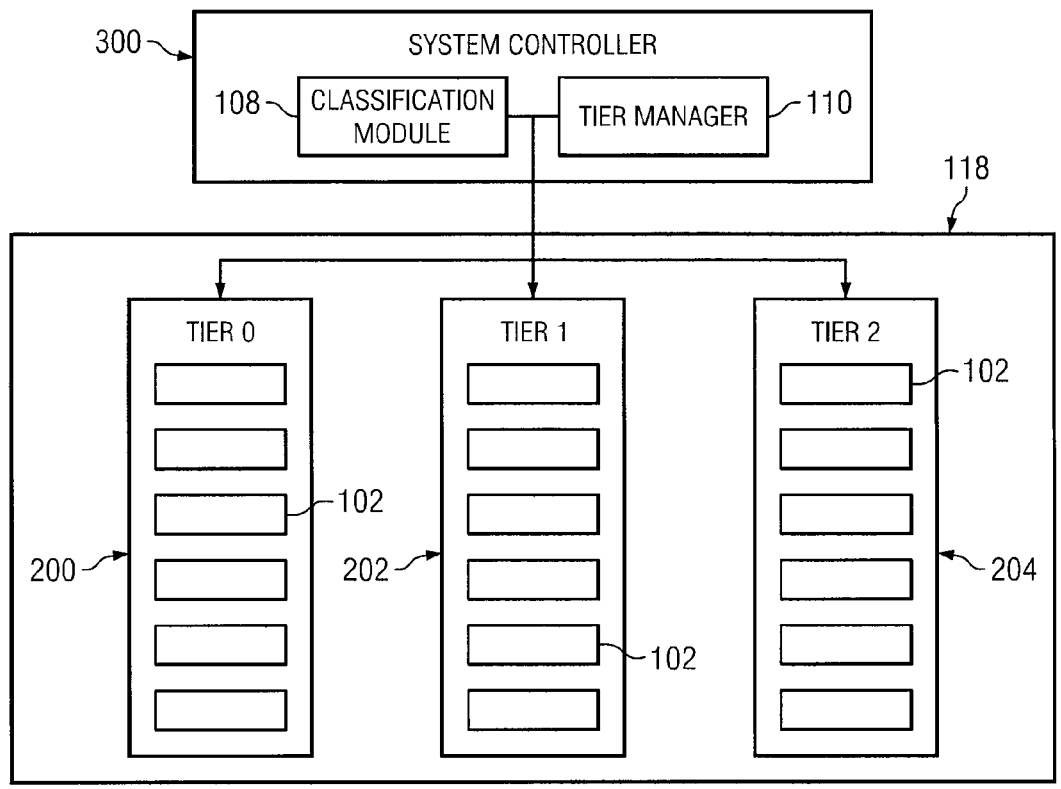
FIG. 3 illustrates an example system for practicing the teachings of the present disclosure.

As depicted in FIG. 3, each storage tier may contain one or more physical storage resources 102. In operation, one or more physical storage resources 102 may appear to an operating system executing on host device 104 as a single logical storage unit. For example, as depicted in FIG. 3, Tier 2 204 may include multiple physical storage resources 102, but the host device 104 may "see" Tier 2 204 instead of seeing separate physical storage resources 102. Although in the embodiment depicted in FIG. 3 each storage tier (200, 202, and 204) is shown as including six physical storage resources 102, a storage tier may include any number of physical storage resources 102. In addition, although the embodiment shown in FIG. 3 depicts three storage tiers (200, 202, and 204), the plurality of physical storage resources 118 may include any number of storage tiers.

FIG. 3 depicts an example system in which the classification module 108 and the tier manager 110 are hosted on a system controller 300. The classification module 108 may be in electronic communication with the tier manager 110 and the storage tiers 200, 202, and 204. Additionally, the tier manager 110 may be in electronic communication with the classification module 108 and the storage tiers 200, 202, and 204.

Figure 4:
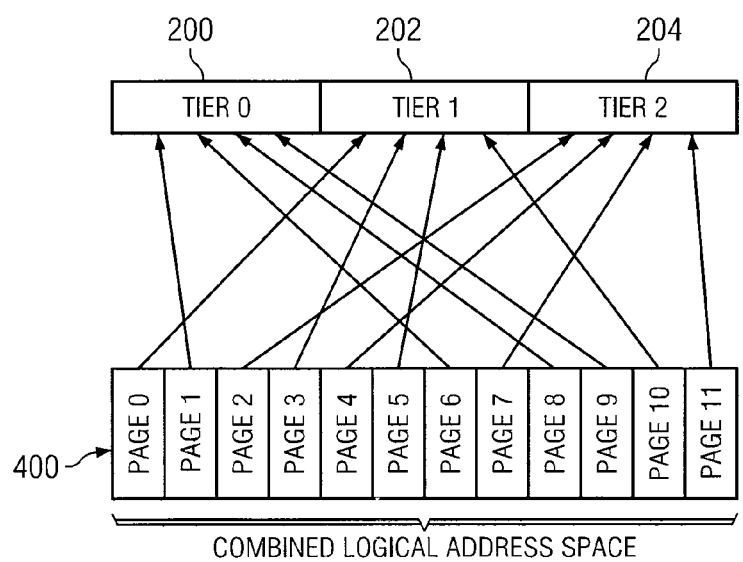
FIG. 4 illustrates an example distribution of data in a set of tiered storage resources, in accordance with teachings of the present disclosure.

As depicted in FIG. 4, the plurality of physical storage resources may be treated as a combined logical address space. In an information handling system utilizing logical addressing, the physical blocks of memory may be mapped to logical addresses by a logical memory program. Programs may use contiguous logical addresses, rather than real, fragmented physical addresses, to store instructions and data. When the program is executed, the logical addresses may be translated by the processor into real memory addresses. In the embodiment shown in FIG. 4, the combined logical address space is divided into pages 400. Each page 400 may occupy a predetermined and an equivalent portion of the combined logical address space.

Tier manager 110 may be configured to determine a seek distance value for each page. A seek distance value may be defined as an average seek distance between consecutive input-output accesses within a page. For example, logical block addressing (LBA) (a common scheme used for specifying the location of blocks of data stored on computer readable medium) locates blocks by an index, with the first block being LBA=0, the second LBA=1, etc. An average seek distance value may be determined by calculating the distance between the LBA of an input-output access within a page and the LBA of the following input-output access within the same page. For example, if a first input-output access is to LBA 10 and the second input-output access is to LBA 100, a seek distance value for that page would be 90.

Tier manager 110 may be configured to determine an operation rate for each page. An operation rate may be defined as an average number of input-output operations per second to a given page. Tier manager 110 may be configured to determine an operation size value for each page. An operation size value may be defined as an average size of the input-output operations to a given page.

Tier manager 110 may be configured to determine an elapsed time value for each page. An elapsed time value may be defined as a time that has elapsed since the last access to a given page.

Tier manager 110 may be configured to calculate a relative randomness value for each page using at least the seek distance value, the operation rate, the operation size value, and the elapsed time value determined for each page. Tier manager 110 may be configured to compare relative randomness values calculated for each page.

In some embodiments, tier manager 110 may be configured to record the seek distance value, the operation rate, the operation size value, and the elapsed time value for each page. In other embodiments, tier manager 110 may be configured to query one or more elements of information handling system 100 to determine the requested values.

Classification module 108 may be configured to assign a physical location for each page such that the relative randomness value for each page in the first tier is greater than the relative randomness value for each page in the second tier. For example, in the embodiment depicted in FIG. 4, the arrows designate the assigned physical location for each page. Accordingly, the relative randomness value for each page assigned to Tier 0 200 would be greater than the relative randomness value for each page assigned Tier 1 202. The relative randomness value for each page assigned Tier 1 202 would be greater than the relative randomness value for each page assigned Tier 2 204.

Figure 5:
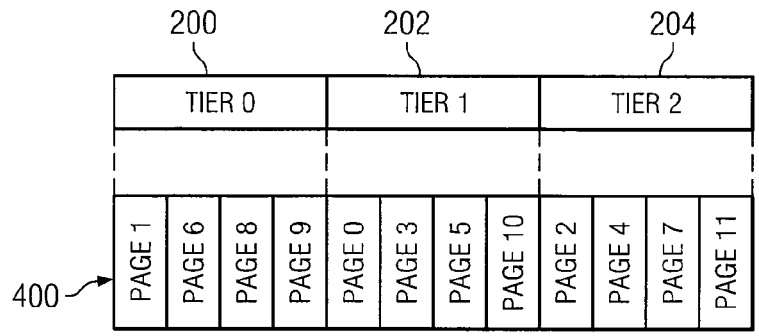
FIG. 5 illustrates an example distribution of data in a set of tiered storage resources after relocation of the pages according to teachings of the present disclosure.

The classification module 108 may be configured to automatically relocate the pages according to the assigned physical location for each page. FIG. 5 illustrates distribution of the data shown in FIG. 4 after the pages have been relocated based on the teachings of the present disclosure.

Figure 6:
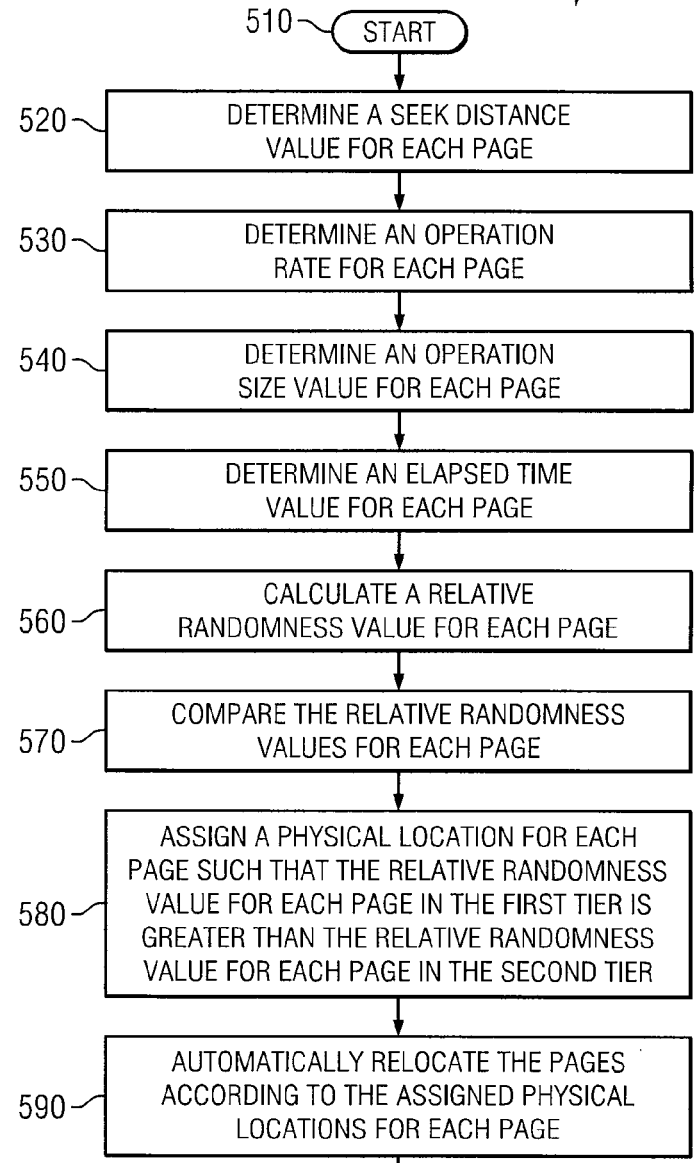
FIG. 6 is a flowchart of an example method for distributing data in an information handling system in accordance with teachings of the present disclosure.

FIG. 6 is a flowchart depicting an example method 500 for distributing data in an information handling system. Method 500 may be implemented using an information handling system including a plurality of physical storage resources arranged in a first and second tier. The performance and cost relative to capacity of the plurality of physical storage resources in the first tier is greater than those in the second tier.

In one embodiment, method 500 begins at step 510. Method 500 may be executed at regular or irregular time intervals. The values of the intervals may depend on resources devoted to this task by information handling system 100 or by the current user activity directed by client systems 106 at information handling system 100.

At step 520 a seek distance value is determined for each page. In some embodiments of information handling system 100, tier manager 110 may be configured to perform step 520.

At step 530, an operation rate is determined for each page. In some embodiments of information handling system 100, tier manager 110 may be configured to perform step 530.

At step 540, an operation size value is determined for each page. In some embodiments of information handling system 100, the tier manager 110 may be configured to perform step 540.

At step 550, an elapsed time value is determined for each page. In some embodiments of information handling system 100, the tier manager 110 may be configured to perform step 550.

At step 560, a relative randomness value is calculated for each page. The relative randomness value may depend on the seek distance value, the operation rate, the operation size value, and/or the elapsed time value determined for each page. In some embodiments the tier manager 110 performs step 560.

In one example embodiment, the relative randomness value calculated in step 560 may be calculated by applying predetermined scaling factors to the seek distance value, the operation rate, the operation size value, and the elapsed time value determined for each page.

In another embodiment, the relative randomness value calculated in step 560 may be calculated by applying scaling factors to the seek distance value (SDV), the operation rate (OR), the operation size value (OSV), and the elapsed time value (ESV) determined for each page and calculating the relative randomness value for each page using the formula $r(x)=\alpha*SDV+\beta*OR-\gamma*OSV-\delta*ETV$, where $r(x)$ is the relative randomness value and $\alpha$, $\beta$, $\gamma$, and $\delta$ are scaling factors. The scaling factors $\alpha$, $\beta$, $\gamma$, and $\delta$ may be determined through examining the characteristics of the different physical storage resources, storage tiers, and other components of the information handling system. In some embodiments, the scaling factors may be determined through experimentation.

In another embodiment, the relative randomness value calculated in step 560 may be calculated by applying scaling factors to the seek distance value (SDV), the operation rate (OR), the operation size value (OSV), and the elapsed time value (ESV) determined for each page and calculating the relative randomness value for each page using formula $r(x)=\alpha*SDV+\beta*OR-\gamma*g(OSV)-\delta*h(ETV)$, where $r(x)$ is the relative randomness value; $\alpha$, $\beta$, $\gamma$, and $\delta$ are scaling factors; and $g(OSV)$ and $h(ETV)$ defined as:

$g(OSV)=\{1 \text{ if } OSV \geq n, 0 \text{ if } OSV < n\}$
$h(ETV)=\{1 \text{ if } ETV \geq t, 0 \text{ if } ETV < t\}$ At step 570, the relative randomness values for each page may be compared. In some embodiments of information handling system 100, the tier manager 110 may be configured to perform step 570.

At step 580, a physical location is assigned for each page such that the relative randomness value for each page in the first tier is greater than the relative randomness value for each page in the second tier. In some embodiments of information handling system 100, the classification module 108 may be configured for perform step 580.

At step 590, the pages may be automatically relocated according to the assigned physical locations for each page. In some embodiments of information handling system 100, the classification module 108 may be configured to perform step 590.

In some embodiments, method 500 may include additional steps (e.g., comparing randomness values to a standard and monitoring the frequency of multiple requirements). In addition, the steps of method 500 may be performed in any appropriate order or frequency (e.g. relative randomness values may be determined more frequently than physical locations are required.

Although the figures and embodiments disclosed herein have been described with respect to information handling systems, it should be understood that various changes, substitutions and alternations can be made herein without departing from the spirit and scope of the disclosure as illustrated by the following claims.

What is claimed is:

1. A system controller for an information handling system, the information handling system including a plurality of physical storage resources arranged in a first tier and a second tier such that both a performance and a cost relative to capacity of the plurality of physical storage resources in the first tier are greater than those in the second tier, the system controller comprising:
   a tier manager in electronic communication with the plurality of physical storage resources;
   a combined logical address space of the plurality of physical storage resources divided into pages;

each page occupying a predetermined and an equivalent portion of combined logical address space;
the tier manager configured to perform operations including:
   determining a seek distance value for each page, the seek distance value defined as an average seek distance between consecutive input-output accesses within a page;
   determining an operation rate for each page, the operation rate defined as an average number of input-output operations per second to a given page;
   determining an operation size value for each page, the operation size value defined as an average size of the input-output operations to a given page;
   determining an elapsed time value for each page, the elapsed time value defined as a time that has elapsed since the last access to a given page;
   calculating a relative randomness value for each page using at least the seek distance value, the operation rate, the operation size value, and the elapsed time value determined for each page;
   comparing the relative randomness values for each page; and
a classification module in electronic communication with the tier manager and the plurality of physical storage resources, the classification module configured to perform operations including:
   assigning a physical location for each page such that the relative randomness value for each page in the first tier is greater than the relative randomness value for each page in the second tier; and
   relocating the pages according to the assigned physical location for each page.

2. A system controller according to claim 1, wherein the tier manager determines and records the seek distance value, the operation rate, the operation size value, and the elapsed time value for each page.

3. A system controller according to claim 1, further comprising the plurality of physical storage resources arranged in a third tier such that both a performance and a cost relative to capacity of the plurality of physical storage resources in the second tier are greater than those in the third tier.

4. A system controller according to claim 1, wherein each time a physical storage resource is added to or removed from the information handling system the system controller:
   identifies each of the plurality of physical storage resources associated with the information handling system, a combined logical address space of the plurality of physical storage resources divided into pages, each page occupying a predetermined and equivalent amount of logical address space; and
   identifies each of the pages associated with the plurality of physical storage resources.

5. A system controller according to claim 1, wherein calculating the relative randomness value for each page includes applying scaling factors to at least each of the seek distance value, the operation rate, the operation size value, and the elapsed time value determined for each page.

6. A system controller according to claim 1, wherein calculating the relative randomness value for each page includes:
   applying scaling factors to the seek distance value(SDV), the operation rate(OR), the operation size value (OSV), and the elapsed time value (ETV) determined for each page; and
   calculating the relative randomness value, the relative randomness value defined as:

$$r(x)=\alpha *SDV+\beta *OR-\gamma *OSV-\delta *ETV$$

7. A system controller according to claim 1, wherein calculating the relative randomness value for each page includes:
   applying scaling factors to the seek distance value(SDV), the operation rate(OR), the operation size value (OSV), and the elapsed time value (ETV) determined for each page; and
   calculating the relative randomness value, the relative randomness value defined as:

$$r(x)=\alpha *SDV+\beta *OR-\gamma *g(OSV)-\delta *h(ETV)$$

g(OSV) and h(ETV) defined as:
   g(OSV)={1 if OSV≧n, 0 if OSV<n}
   h(ETV)={1 if ETV≧t, 0 if ETV<t}
wherein n and t are determined by the overall system characteristics.

8. An information handling system comprising:
a plurality of physical storage resources;
wherein the plurality of physical storage resources comprises:
   a first tier including one or more physical storage resources; and
   a second tier including one or more physical storage resources, each of which has a lower performance and cost relative to capacity than each of the one or more physical storage resources of the first tier;
a combined logical address space of the plurality of physical storage resources divided into pages;
each page occupying a predetermined and an equivalent amount of logical address space;
a tier manager hosted on the information handling system and in electronic communication with the plurality physical storage resources, the tier manager configured to perform operations including:
   determining a seek distance value for each page, the seek distance value defined as an average seek distance between consecutive input-output accesses within a page;
   determining an operation rate for each page, the operation rate defined as an average number of input-output operations per second to a given page;
   determining an operation size value for each page, the operation size value defined as an average size of the input-output operations to a given page;
   determining an elapsed time value for each page, the elapsed time value defined as a time that has elapsed since the last access to a given page;
   calculating a relative randomness value for each page using at least the seek distance value, operation rate, operation size value, and elapsed time value determined for each page;
   comparing the relative randomness values for each page; and
a classification module in electronic communication with the tier manager and the plurality of physical storage resources, the classification module configured to perform operations including:
   assigning a physical location for each page such that the relative randomness value for each page in the first tier is greater than the relative randomness value for each page in the second tier; and
   relocating the pages according to the assigned physical location for each page.

9. An information handling system according to claim 8, wherein the tier manager determines and records the seek distance value, the operation rate, the operation size value, and the elapsed time value determined for each page.

10. An information handling system according to claim 8, further comprising the tier manager hosted on a system controller associated with the information handling system.

11. An information handling system according to claim 8, further comprising the tier manager hosted on a general purpose computer associated with the information handling system.

12. An information handling system according to claim 8, further comprising the tier manager hosted on an intelligent switch associated with the information handling system.

13. An information handling system according to claim 8, further comprising the tier manager hosted on a distributed file system associated with the information handling system.

14. An information handling system according to claim 8, further comprising:
a third tier including one or more physical storage resources, each of which has a lower performance and cost relative to capacity than each of the one or more physical storage resources of the second tier; and
wherein the classification module is configured to assigning a physical location for each page such that the relative randomness value for each page in the second tier is greater than the relative randomness value for each page in the third tier.

15. A method for distributing random and sequential data in an information handling system, the information handling system including a plurality of physical storage resources arranged in a first and second tier such that the performance and cost relative to capacity of the plurality of physical storage resources in the first tier is greater than those in the second tier, the method comprising:
determining a seek distance value for each page, the seek distance value defined as an average seek distance between consecutive input-output accesses within a page;
determining an operation rate for each page, the operation rate defined as an average number of input-output operations per second to a given page;
determining an operation size value for each page, the operation size value defined as an average size of the input-output operations to a given page;
determining an elapsed time value for each page, the elapsed time value defined as a time since the last access to the page;
calculating a relative randomness value for each page using at least the seek distance value, the operation rate, the operation size value, and the elapsed time value determined for each page;
comparing the relative randomness values for each page;
assigning a physical location for each page such that the relative randomness value for each page in the first tier is greater than the relative randomness value for each page in the second tier; and relocating the pages according to the assigned physical locations for each page.

16. A method according to claim 15, wherein the following operations are performed each time a physical storage resource is added to or removed from the information handling system, the method further comprising:
identifying each of the plurality of physical storage resources associated with the information handling system, a combined logical address space of the plurality of physical storage resources divided into pages, each page occupying a predetermined and equivalent amount of logical address space; and
identifying each of the pages associated with the plurality of physical storage resources.

17. A method according to claim 15, wherein calculating the relative randomness value for each page includes:
applying scaling factors to at least each of the seek distance value, the operation rate, the operation size value, and the elapsed time value determined for each page.

18. A method according to claim 15, wherein calculating the relative randomness value for each page includes:
applying scaling factors to the seek distance value(SDV), the operation rate(OR), the operation size value (OSV), and the elapsed time value (ETV) determined for each page; and
calculating the relative randomness value, the relative randomness value defined as:

$$r(x)=\alpha*SDV+\beta*OR-\gamma*OSV-\delta*ETV$$

19. A method according to claim 15, wherein calculating the relative randomness value for each page includes:
applying scaling factors to the seek distance value(SDV), the operation rate(OR), the operation size value (OSV), and the elapsed time value (ETV) determined for each page; and
calculating the relative randomness value, the relative randomness value defined as:

$$r(x)=\alpha*SDV+\beta*OR-\gamma*g(OSV)-\delta*h(ETV)$$

g(OSV) and h(ETV) defined as:
g(OSV)={1 if OSV≧n, 0 if OSV<n}
h(ETV)={1 if ETV≧t, 0 if ETV<t}
wherein n and t are determined by the overall system characteristics.

20. A method according to claim 15, wherein the plurality of physical storage resources includes a third tier such that the performance and cost relative to capacity of the plurality of physical storage resources in the second tier is greater than those in the third tier and further comprising assigning a physical location for each page such that the relative randomness value for each page in the second tier is greater than the relative randomness value for each page in the third tier.

* * * * *